(12) United States Patent
Yao

(10) Patent No.: US 6,628,850 B1
(45) Date of Patent: Sep. 30, 2003

(54) DYNAMIC WAVELENGTH-SELECTIVE GRATING MODULATOR

(75) Inventor: X. Steve Yao, Diamond Bar, CA (US)

(73) Assignee: General Photonics Corporation, Chino, CA (US)

( * ) Notice: Subject to any disclaimer, the term of this patent is extended or adjusted under 35 U.S.C. 154(b) by 0 days.

(21) Appl. No.: 09/683,792

(22) Filed: Feb. 14, 2002

Related U.S. Application Data

(60) Provisional application No. 60/269,601, filed on Feb. 15, 2001.

(51) Int. Cl.[7] ............................................. G02F 1/295
(52) U.S. Cl. .................... 385/10; 385/2; 385/37
(58) Field of Search ........................... 385/1–4, 8–10, 385/27, 37, 123

(56) References Cited

U.S. PATENT DOCUMENTS

| | | | |
|---|---|---|---|
| 5,611,004 A | * | 3/1997 | Chang et al. .................. 385/11 |
| 5,832,148 A | * | 11/1998 | Yariv ........................... 385/16 |
| 6,215,928 B1 | * | 4/2001 | Friesem et al. ................ 385/37 |
| 6,330,383 B1 | * | 12/2001 | Cai et al. ....................... 385/37 |
| 6,389,199 B1 | * | 5/2002 | Eldada et al. .................. 385/37 |

* cited by examiner

Primary Examiner—Akm Enayet Ullah
Assistant Examiner—Jerry T Rahll
(74) Attorney, Agent, or Firm—Fish & Richardson P.C.

(57) ABSTRACT

Techniques and devices for modulating an optical signal transmitting through an optical waveguide such as a fiber and a planar waveguide by dynamically controlling an adjustable grating formed in a cladding layer of the waveguide.

21 Claims, 4 Drawing Sheets ical signal is not completely confined within the physical boundary of the fiber core. Instead, the spatial distribution optical field of a guided optical signal extends outside the fiber core via an evanescent field that essentially decays as an exponential function of the distance from the core-cladding interface. This evanescent field, therefore, may be manipulated to control the guided optical signal in the fiber core.

DYNAMIC WAVELENGTH-SELECTIVE GRATING MODULATOR

CROSS REFERENCE TO RELATED APPLICATIONS

This application claims the benefit of U.S. Provisional Application No. 60/269,601 filed Feb. 15, 2001, which is incorporated herein by reference.

BACKGROUND OF INVENTION

This application relates to techniques and devices for controlling light in optical waveguides such as optical fibers and other light-channeling devices. Optical waveguides include optical fibers, dielectric slab waveguide formed on a substrate, or other light-channeling devices. Such a waveguide may be used to transport light from one location to another in an optical network, within an integrated optical device, or in other settings. A waveguide may be formed by a dielectric channel that is surrounded by one or more dielectric materials with indices of refraction less than that of the dielectric channel.

For example, a typical fiber may include a fiber core, a cladding layer surrounding the fiber core, and possibly other protection layers outside the cladding layer. The refractive index of the fiber core is higher than that of the fiber cladding. Light rays, when coupled into the fiber core within a maximum angle with respect to the axis of the fiber core, can be totally reflected at the core-cladding interface and thus are spatially confined within the fiber core.

SUMMARY OF INVENTION

One embodiment of a wavelength-selective grating modulator includes a fiber having a fiber core and a fiber cladding layer surrounding the fiber core, and a plurality of grating trenches formed in the fiber cladding layer. The grating trenches are filled with a dielectric material that is different from the fiber cladding layer. This dielectric material is operable to change a refractive index in response to a control signal to exhibit a first refractive index substantially equal to a refractive index of the fiber cladding layer when the control signal is at a first value and to exhibit a second refractive index different from the refractive index of the cladding layer when the control signal is at a second value.

When the control signal is at the second value, a grating is present in the fiber to couple energy out of the fiber. This coupling may be used to either modulate the guided light or to attenuate the guided light. The same mechanism may be implemented in a waveguide other than a fiber, such as a planar waveguide.

DETAILED DESCRIPTION

Figure 1:
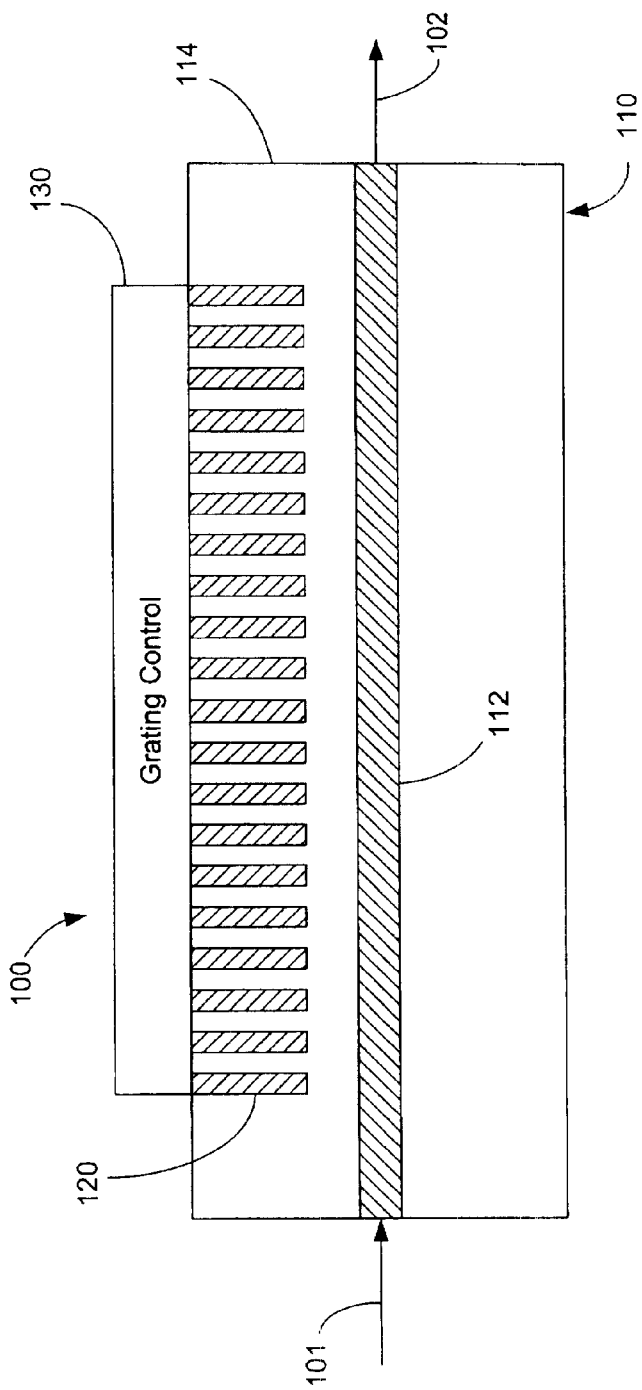
FIG. 1 shows an optical fiber modulator with a controllable grating in the cladding according to one embodiment of the disclosure.
Figure 1A:
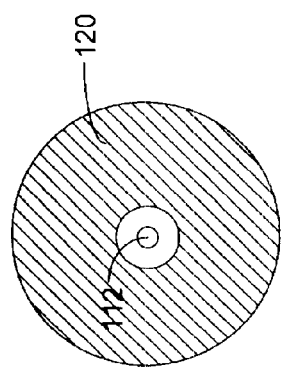
FIGS. 1A and 1B show cross-sectional views of two different exemplary configurations of the controllable grating in the cladding.
Figure 1B:
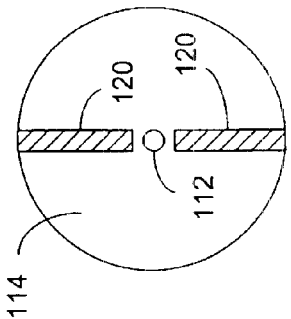

The techniques and devices of the present disclosure are in part based on the recognition that the guided optical FIG. 1 shows an optical modulator 100 according to one embodiment of the present disclosure. The modulator 100 includes an optical fiber 110 which has a fiber core 112 and a fiber cladding 114. The refractive index of the cladding 114 is less than that of the core 112. An optical grating 120 is formed in the cladding 114 on at least one side of the fiber core 112 as illustrated. Alternatively, two identical gratings 120 may be formed on two opposite sides of the fiber core 112 as shown in FIG. 1A, or the grating 120 may surround the fiber core 112 as shown in FIG. 1B.

The grating 120 has a spatial periodic pattern along the fiber 110 and is positioned close to the fiber core 112 to interact with the evanescent field of a guided optical signal in the fiber core 112. The spacing between the grating 120 and the fiber core 112 may be typically on the order of one wavelength of the guided optical signal or less. The grating 120 may be designed to have a constant period, or a spatially-chirped period that varies linearly or nonlinearly with position along the fiber 110.

The grating period at one location of the grating 120 may be designed to couple optical energy at a selected wavelength from one optical mode to another optical mode supported by the fiber 110 that satisfies a respective Bragg condition. Such optical modes include one or more core modes that are confined in the fiber core 112 and cladding modes supported by the fiber cladding 114. For example, the grating 120 may couple energy between two counter-propagating modes in the fiber core 112, between a core mode in the core 112 and a cladding mode in the cladding 114, between two different transverse modes, or between two different polarization modes when the fiber 110 is birefringent. The optical modulator 100 modulates an input signal 101 to produce a modulated output signal 102 by coupling energy at the selected wavelength either out of the signal 101 or into the signal 101 based on one of above mode coupling schemes. Light at other wavelengths does not "see" the grating 120 since the Bragg condition is not satisfied and hence propagates through the fiber 110 without being modulated by the grating 120. Therefore, in this context, the optical modulator 100 is wavelength selective.

The grating 120 in the modulator 100 is specially designed. First, the fiber cladding 114 is processed to form periodic grating trenches by removing cladding material from selected locations along the fiber 110. The spacing between two adjacent grating trenches at each location and the dimension of each trench are designed to achieve a selected mode coupling for light at a selected wavelength. This process may be accomplished by etching the fiber core 114 or other suitable processes. Next, the grating trenches are filled with a dielectric material whose refractive index can be varied in response to an external control signal. Examples of such a dielectric material include, but are not limited to, an electro-optic material (e.g., liquid crystal and polymer) and a thermal-optical material with a thermal coefficient of the refractive index larger than that of the fiber cladding 114.

Notably, the refractive index of the dielectric material has at least two distinctly different values: a first value that is substantially equal to the refractive index of the cladding 114 in response to a first value of the control signal, and a second value that is sufficiently different from the refractive index of the cladding 114 to effectuate the desired mode coupling, e.g., on the order of magnitude of $10^{-4}$. Therefore, when the dielectric material in the trenches is controlled to exhibit the first value of its refractive index, the grating 120 essentially "disappears" to the light at the selected wavelength. Since light at wavelengths other than the selected wavelength in the input signal 101 is not affected by the grating 120, the input signal 101 is not modulated by the grating 120 by transmitting therethrough. When the dielectric material in the trenches is controlled to exhibit the second value in its refractive index, light at the selected wavelength in the input signal 101 is coupled into another mode and hence the output signal 102 is modulated. This grating coupling mechanism may also be used to attenuate the guided light as illustrated in a system shown in FIG. 4.

The optical modulator 100 uses a grating control mechanism 130 for controlling the refractive index of the dielectric material in the grating trenches in the cladding 114. If an electro-optic material is used to fill the grating trenches, the grating control mechanism 130 includes a circuit and electrodes to apply a control voltage to the grating trenches to control and vary the refractive index. If a thermal-optic material is used, the control mechanism 130 includes a thermal control device that controls and changes the temperature of the grating trenches in order to vary the refractive index.

Figure 2:
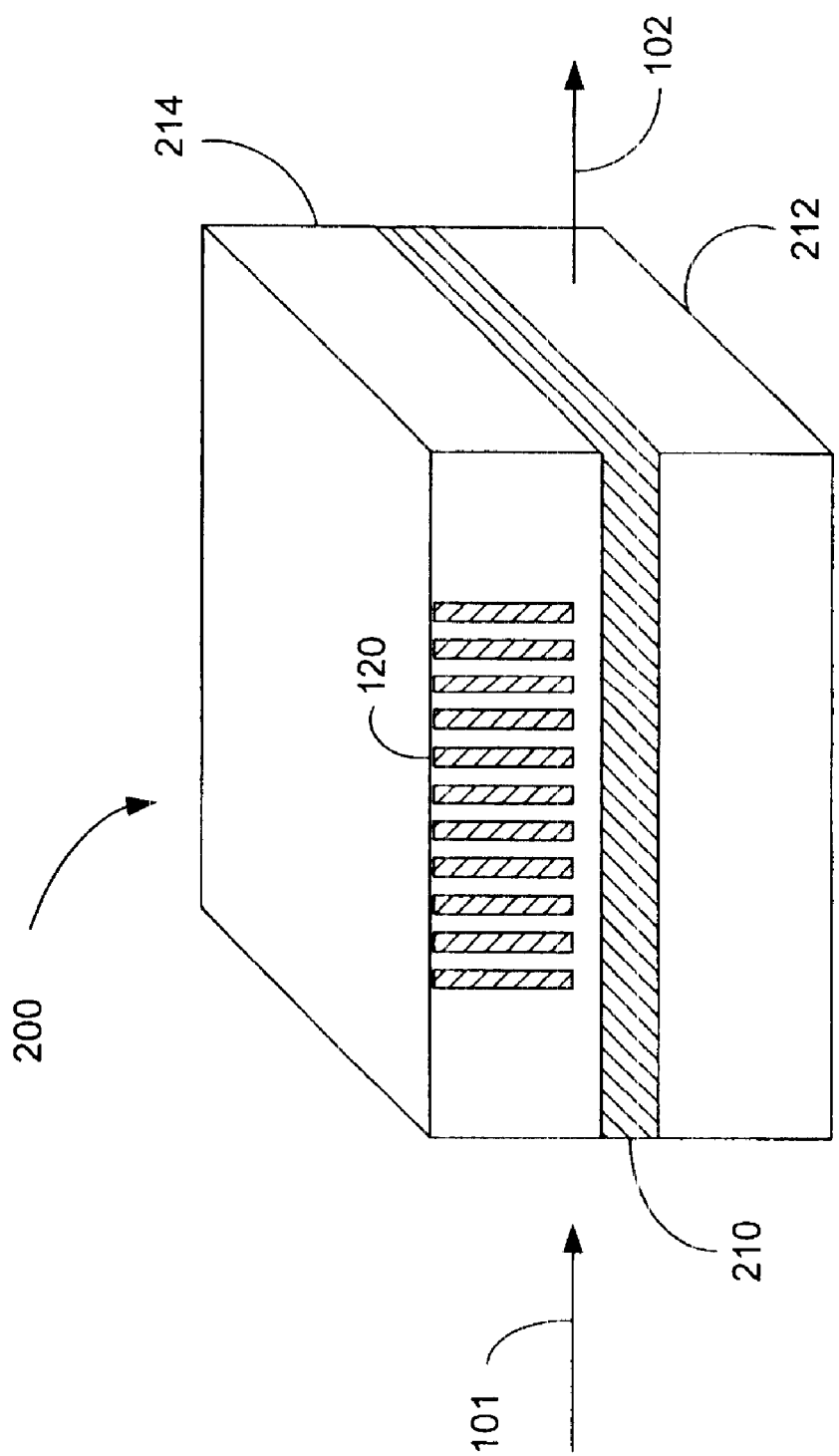
FIG. 2 shows an optical modulator formed in a planar waveguide with a controllable optical grating formed in at least one of the cladding layer according to another embodiment.

FIG. 2 shows another optical modulator 200 formed in a planar waveguide based on the above controllable grating 120. The waveguide includes a core waveguide layer 210 switched between two planar cladding layers 212 and 214. The refractive index of the core waveguide layer 210 is greater than that of either cladding layer 212 or 214. The refractive indices of the cladding layers 212 and 214 may be equal or different. The grating 120 may be formed in at least one of the cladding layers 212 and 214. The waveguide may be formed on a substrate. In implementation, the cladding layer 212 may be either a layer fabricated over the substrate or a part of the substrate. Similar to the geometry in FIG. 1A, each cladding layer may include a grating 120.

In certain applications, such as wavelength-division-multiplexed (WDM) devices or systems, two or more dynamic wavelength-selective grating modulators as described above for coupling light at different wavelengths may be formed in a single waveguide, e.g., in series, to modulate spectral components at different wavelengths in guided light. The following sections describe exemplary applications that use two or more of the above grating modulators, either as separate devices connected in series or formed in a single fiber or planar waveguide.

Figure 3:
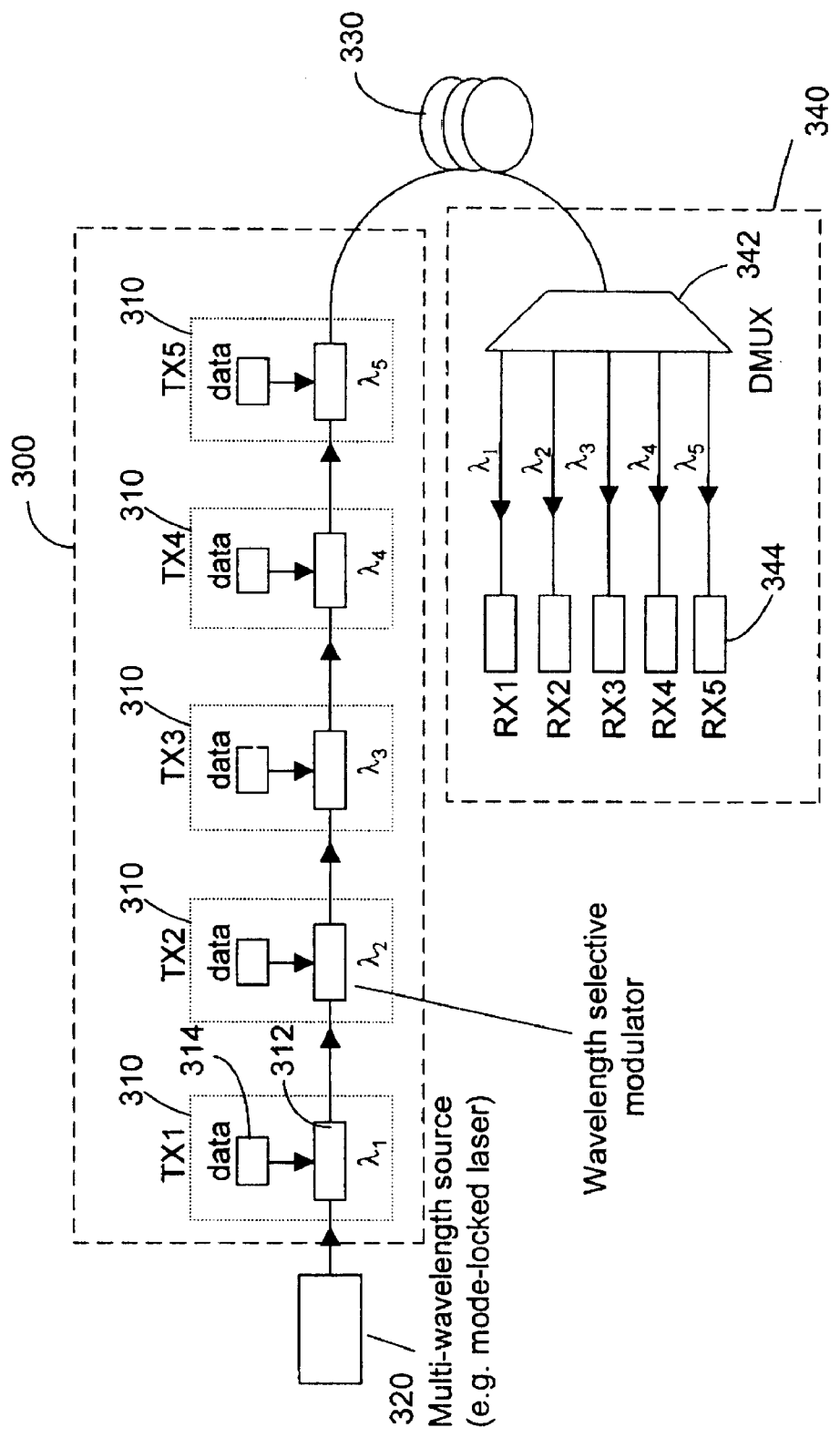
FIGS. 3, 4, and 5 show exemplary applications of the above wavelength-selective grating modulators.

FIG. 3 shows a WDM system that implements a WDM data transmitter 300 for sending WDM channels at different wavelengths to a fiber link 330. The WDM data transmitter 300 includes two or more data transmitters 310 connected optically in series to receive optical carriers at different WDM wavelengths. Each data transmitter 310 may be implemented based on the embodiments shown in FIGS. 1, 1A, 1B, and 2 and hence can be controlled to modulate a carrier at a selected WDM wavelength while transmitting light at other wavelengths essentially without any modulation. As illustrated, each data transmitter 310 has a wavelength-selective grating modulator 312 and a grating control circuit 314. The grating period of each grating modulator 312 may be set to be different from the grating period from another grating modulator so that different grating modulators have different Bragg conditions to interact with light at different wavelengths. The grating control circuit 314 controls and modulates the grating modulator 312 to superimpose data for the corresponding WDM channel to the carrier at the selected WDM wavelength. Hence, different data transmitters 310 operate to superimpose data for different WDM channels to the different carriers. Notably, a WDM multiplexer is not required in this design because each transmitter 310 is wavelength selective and thus different WDM carriers can be transmitted through the same optical path and modulated individually without spatially separating them. Therefore, WDM transmission based on this design can reduce the cost and simplify the hardware configuration when compared to WDM transmission with a WDM multiplexer. In implementation, the individual grating control circuits 314 may be integrated in a central control unit.

At the system level, the WDM system in FIG. 3 may use a multi-wavelength light source 320 such as a mode-locked laser to produce the carriers at different WDM wavelengths. After transmission and modulation by the WDM data transmitter 300, the WDM channels are delivered in the same fiber through the fiber link 330 to a WDM receiver 340. A WDM demultipelxer 342 in the receiver 340 separates different WDM channels and directs the separated WDM channels to individual channel receivers 344.

Figure 4:
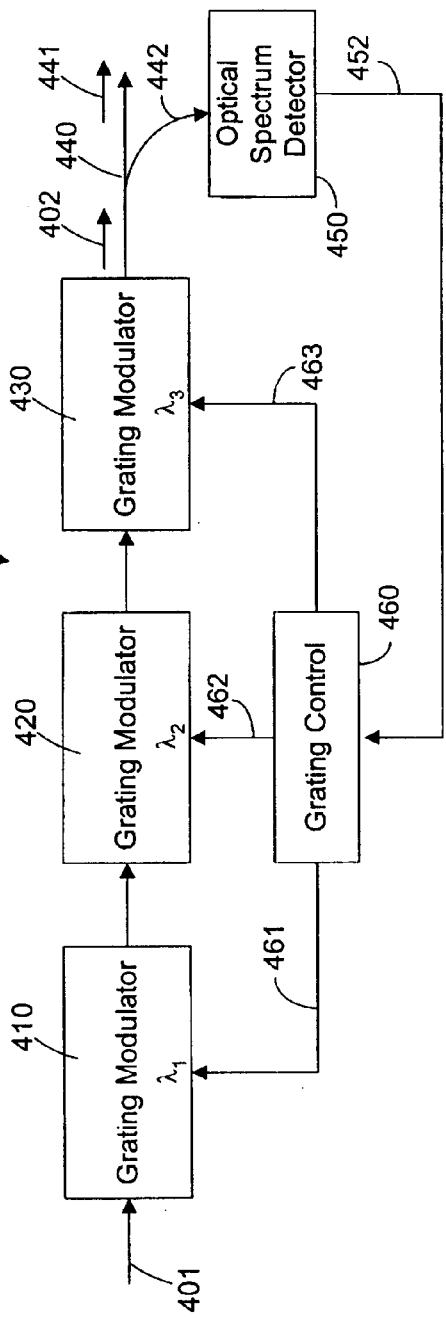

FIG. 4 shows a channel equalizer 400 by cascading two or more wavelength-selective grating modulators 410, 420, and 430 at different wavelengths according to one embodiment. An input WDM signal 401 with different WDM channels may have different signal strengths for different WDM channels, which may be caused by different optical gains at different WDM wavelengths at the signal generation or amplification stage, or by different optical attenuation for different channels at the signal transmission or delivery stage for example. The channel equalizer 400 may be used to adjust the relative signal strengths of different received WDM channels to substantially equalize the signal strengths of different channels in an output signal 402.

The channel equalizer 400 may include an optical coupler 440, such as a fiber coupler, at the output of the last grating modulator 430 to split a small fraction of the output signal 402 as an optical monitor signal 442. The remaining and majority of the output 402 is sent out as an output 441. An optical spectrum detector 450 may be used to receive and detect the different WDM channels in the optical monitor signal 442 so that the amplitudes of individual WDM channels can be measured. A grating control unit 460, coupled to receive the output 452 from the detector 450, is designed to generate controls signals 461, 462, and 463 in response to the measured amplitudes of different WDM channels so that grating modulators 410, 420, and 430 can be individually adjusted to equalize the amplitudes in the output 402.

Figure 5:
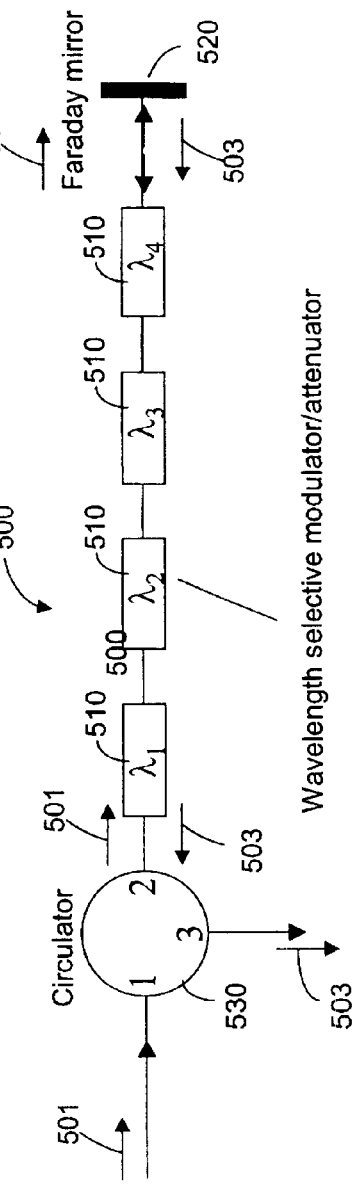

FIG. 5 shows yet another application 500 where two or more wavelength-selective grating modulators 510 operating at different wavelengths are cascaded in a common optical path for processing an input optical signal 501 with different WDM channels. A Faraday reflector 520 is positioned at the output of the last grating modulator to reflect the transmission 502 of the signal 501 after passing through all grating modulators 510 back as a reflected signal 503. The Faraday reflector 520, different from a regular reflector, operates to rotate the polarization of the reflected light 503 to be orthogonal to the polarization of the signal 502 at each location of the optical path. Hence, the optical signal passes the same optical path connecting all grating modulators 510 twice with orthogonal polarizations. This configuration can be used to substantially reduce or eliminate the polarization-dependent optical loss or optical modulation of the grating modulators 510.

In implementation, an optical circulator 530 is placed in the input side of the grating modulators 510 to receive the input signal 501 at a terminal 1 and to direct the input signal 501 to the grating modulators 510 at another terminal 2. The reflected signal 503, which is received by the circulator 530 at the terminal 2, is then directed to a third terminal 3 to exit the system.

Although only a few embodiments are described, it is understood that various modifications and enhancements may be made without departing from the following claims.

What is claimed is:

1. A device, comprising:
   a plurality of dynamic gratings cascaded in an optical path, each dynamic grating including a fiber having a fiber core and a fiber cladding layer surrounding said fiber core, and a plurality of grating trenches formed in said fiber cladding layer and filled with a dielectric material that is different from said fiber cladding layer, wherein said dielectric material is operable to change a refractive index in response to a control signal to exhibit a first refractive index substantially equal to a refractive index of said fiber cladding layer when said control signal is at a first value and to exhibit a second, different refractive index when said control signal is at a second value;
   a control unit to produce said control signal to each grating; and
   an optical detector coupled to receive at least a portion of an optical signal with a plurality of wavelength-division-multiplexed (WDM) channels passing through said plurality of dynamic gratings and operable to measure amplitudes of said WDM channels, wherein said control unit is coupled to receive a detector output representing said measured amplitudes and is operable to control said plurality of dynamic gratings to substantially equalize amplitudes of said WDM channels in response to said measured amplitudes.

2. The device as in claim 1, wherein said grating trenches have a chirped grating period.

3. The device as in claim 1, wherein said dielectric material in said grating trenches includes an electro-optic material.

4. The device as in claim 1, wherein said dielectric material in said grating trenches includes a thermal-optical material.

5. The device as in claim 1, wherein said fiber is birefringent to support at least two different polarization modes, and wherein said grating trenches are configured to cause optical coupling between said two different polarization modes when said control signal is at said second value.

6. The device as in claim 1, further comprising a Faraday reflector positioned in said optical path at one side of said plurality of dynamic gratings to receive an optical signal passing through said plurality of dynamic gratings, said Faraday reflector operable to reflect said optical signal back to said plurality of dynamic gratings as a reflected optical signal by making a polarization of said reflected optical signal substantially orthogonal to a polarization of said optical signal prior to reflection.

7. The device as in claim 6, further comprising an optical circulator positioned in said optical path on an opposite side of said plurality of dynamic gratings to direct said optical signal into said plurality of dynamic gratings and to direct said reflected optical signal from said plurality of dynamic gratings to an output optical path.

8. The device as in claim 1, wherein said control unit is operable to individually controls said plurality of dynamic gratings to superimpose data of different wavelength-division-multiplexed (WDM) channels in optical carriers at different WDM wavelengths, respectively.

9. The device as in claim 8, further comprising a light source operable to produce said optical carriers at said different WDM wavelengths.

10. The device as in claim 9, wherein said light source includes a mode-locked laser.

11. A device, comprising:
    a plurality of dynamic gratings cascaded in an optical path, each dynamic grating including a waveguide element and a cladding layer over one side of or surrounding said waveguide element, and a plurality of grating trenches formed in said cladding layer and filled with a dielectric material that is different from said cladding layer, wherein said dielectric material is operable to change a refractive index in response to a control signal to exhibit a first refractive index substantially equal to a refractive index of said cladding layer when said control signal is at a first value and to exhibit a second, different refractive index when said control signal is at a second value;
    a control unit to produce said control signal to each grating; and
    an optical detector coupled to receive at least a portion of an optical signal with a plurality of wavelength-division-multiplexed (WDM) channels passing through said plurality of dynamic gratings and operable to measure amplitudes of said WDM channels, wherein said control unit is coupled to receive a detector output representing said measured amplitudes and is operable to control said plurality of dynamic gratings to substantially equalize amplitudes of said WDM channels in response to said measured amplitudes.

12. The device as in claim 11, wherein said grating trenches have a chirped grating period.

13. The device as in claim 11, wherein said dielectric material in said grating trenches includes an electro-optic material.

14. The device as in claim 11, wherein said dielectric material in said grating trenches includes a thermal-optical material.

15. The device as in claim 11, wherein said waveguide element is birefringent to support at least two different polarization modes, and wherein said grating trenches are configured to cause optical coupling between said two different polarization modes when said control signal is at said second value.

16. A method, comprising:
    directing light into a waveguide which has a cladding layer formed with a plurality of grating trenches, wherein said grating trenches are filled with a dielectric material that is different from said cladding layer, said dielectric material responsive to a control signal to change a refractive index to exhibit a first refractive index substantially equal to a refractive index of said cladding layer when said control signal is at a first value and to exhibit a second, different refractive index when said control signal is at a second value; and
    causing said control signal to be adjusted from said first value to said second value to couple at least a portion of light guided in said waveguide at a wavelength that satisfies a Bragg condition to control an amplitude of said light.

17. A method, comprising:

causing a plurality of grating trenches to be formed in a fiber cladding layer of a fiber, wherein said grating trenches are filled with a dielectric material that is different from said fiber cladding layer, said dielectric material responsive to a control signal to change a refractive index to exhibit a first refractive index substantially equal to a refractive index of said fiber cladding layer when said control signal is at a first value and to exhibit a second, different refractive index when said control signal is at a second value; and causing said control signal to be adjusted from said first value to said second value to couple at least a portion of light guided in said fiber at a wavelength that satisfies a Bragg condition to control an amplitude of said light.

18. The method as in claim 17, further comprising using a thermal-optical material as said dielectric material in said grating trenches.

19. The method as in claim 17, further comprising causing said control signal to be adjusted between said first value and said second value to modulate said light.

20. The method as in claim 17, further comprising causing said fiber to be birefringent to support at least two different polarization modes, and wherein said grating trenches are configured to cause optical coupling between said two different polarization modes when said control signal is at said second value.

21. The method as in claim 18, further comprising using an electro-optic material as said dielectric material in said grating trenches.

* * * * *